United States Patent
Keelapandal Ramamoorthy et al.

(10) Patent No.: US 9,382,364 B2
(45) Date of Patent: Jul. 5, 2016

(54) PROCESS FOR PRODUCING POLYMERS

(71) Applicant: BASF SE, Ludwigshafen (DE)

(72) Inventors: Shankara Narayanan Keelapandal Ramamoorthy, Limburgerhof (DE); Oliver Soetje, Mannheim (DE); John Scott Barratt, Mirfield (GB); Gabriela Eugenia Fonseca Zepeda, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/425,432

(22) PCT Filed: Sep. 23, 2013

(86) PCT No.: PCT/IB2013/058769
§ 371 (c)(1),
(2) Date: Mar. 3, 2015

(87) PCT Pub. No.: WO2014/049513
PCT Pub. Date: Apr. 3, 2014

(65) Prior Publication Data
US 2015/0232600 A1   Aug. 20, 2015

Related U.S. Application Data

(60) Provisional application No. 61/705,647, filed on Sep. 26, 2012.

(30) Foreign Application Priority Data

Sep. 26, 2012 (EP) .................... 12186016

(51) Int. Cl.
*C08F 2/00* (2006.01)
*C08F 20/00* (2006.01)
(Continued)

(52) U.S. Cl.
CPC ............. *C08F 222/38* (2013.01); *B01J 19/245* (2013.01); *C08F 222/02* (2013.01); *C08F 222/10* (2013.01); *B01J 2219/24* (2013.01)

(58) Field of Classification Search
CPC .... C08F 222/38; C08F 222/02; C08F 222/10; B01J 19/245; B01J 2219/24
USPC ..................... 526/65, 303.1, 317.1; 422/134
See application file for complete search history.

(56) References Cited

U.S. PATENT DOCUMENTS 3,252,950 A   5/1966  Terenzi et al.
3,278,642 A * 10/1966  Lee .................. C08F 279/04
                                                         525/243

(Continued)

FOREIGN PATENT DOCUMENTS

EP   0 725 084 A1   8/1996
GB   1054028        1/1967

(Continued)

OTHER PUBLICATIONS

International Search Report and Written Opinion issued Mar. 6, 2014 in PCT/IB2013/058769.

(Continued)

*Primary Examiner* — William Cheung
(74) *Attorney, Agent, or Firm* — Oblon, McClelland, Maier & Neustadt, L.L.P.

(57) ABSTRACT

A process for preparation of a polymer product comprising the steps of i) feeding an aqueous mixture comprising a monoethylenically unsaturated monomer or a mixture of monoethylenically unsaturated monomers into a first reactor device (2) through at least one inlet; ii) partially polymerising the monomer or monomers and transferring the polymerising monomer or mixture of monomers from the inlet to an outlet (3) of the first reactor device (2) to provide a partially polymerised product; iii) flowing the partially polymerised product out of the outlet (3), in which no more than 60% of the monomer or mixture of monomers has been polymerised in the partially polymerised product as it exits the outlet (3) of first reactor device (2), and transferring it to a further reactor device (5), in which the further reactor device (5) has an inlet and an outlet (6); iv) continuing the polymerisation in the further reactor device (5) and removing the polymer product from the outlet (6) of the further reactor device (5), characterised in that the first reactor device (2) comprises a positive displacement pump.

11 Claims, 2 Drawing Sheets

(51) Int. Cl.
*C08F 20/06* (2006.01)
*B01J 19/18* (2006.01)
*C08F 222/38* (2006.01)
*C08F 222/02* (2006.01)
*C08F 222/10* (2006.01)
*B01J 19/24* (2006.01)

(56) References Cited

U.S. PATENT DOCUMENTS

| | | | | |
|---|---|---|---|---|
| 3,759,879 | A | * | 9/1973 | Floros ............... B01J 19/20 526/325 |
| 5,059,914 | A | | 10/1991 | Lacombe et al. |
| 5,633,329 | A | | 5/1997 | Hähnle et al. |
| 6,632,907 | B1 | | 10/2003 | Mizota et al. |
| 7,619,046 | B2 | | 11/2009 | Broughton et al. |
| 8,981,020 | B2 | | 3/2015 | Luo et al. |
| 2009/0076231 | A1 | | 3/2009 | Broughton et al. |

FOREIGN PATENT DOCUMENTS

| | | |
|---|---|---|
| JP | 03-111408 | 5/1991 |
| JP | 2000-026507 | 1/2000 |
| JP | 2008-539291 | 11/2008 |
| KR | 10-2009-0014993 | 2/2009 |
| WO | WO 2006/117292 A1 | 11/2006 |

OTHER PUBLICATIONS

David M. Pfund, et al., "Inline ultrasonic rheometry by pulsed Doppler", Ultrasonics, vol. 44, Science Direct, (2006), pp. e477-e482.
Johan Wiklund, et al., "Methodology for in-line rheology by ultrasound Doppler velocity profiling and pressure difference techniques", Chemical Engineering Science, vol. 62, (2007), pp. 4277-4293.
Office Action issued Feb. 8, 2016 in Japanese Patent Application No. 2015-533737.
Office Action issued Feb. 1, 2016 in Korean Patent Application No. 10-2015-7010335 (with English translation).
Extended European search report issued Apr. 8, 2016, in Patent Application No. 13841554.2.

* cited by examiner

PROCESS FOR PRODUCING POLYMERS

CROSS-REFERENCE TO RELATED APPLICATIONS

This application is a National Stage of PCT/IB2013/058769, which was filed on Sep. 23, 2013. PCT/IB2013/058769 claims the benefit of priority to U.S. Provisional Application No. 61/705,647, which was filed on Sep. 26, 2012. This application is based upon and claims the benefit of priority to European Application No. 12186016.7, which was filed on Sep. 26, 2012.

The present invention refers to a process for preparing polymers and a reactor apparatus.

GB 1,054,028 describes a process for the batch-wise preparation of water-soluble polymers, which comprises polymerizing a monomer in an aqueous medium to form a viscous solution comprising the polymer and squeezing the viscous solution out of the reactor by using a close fit partition. The reactor is either a vertical or horizontal tube. If it is a vertical tube it has a conically shaped bottom part. The disadvantage of this reactor is that it does not allow a continuous preparation of polymer.

EP 0 725 084 A1 describes a process for preparing polymers which comprises polymerizing monomers in an aqueous medium to form a gel-like mixture comprising the polymer and squeezing the gel-like mixture out of the bottom of the reactor by using inert gas. The reactor used for the polymerization consists of a top part, which is a vertical tube, and a bottom part, which is of conical shape.

The disadvantage of this reactor is that some monomer comes down the inner walls of the reactor as a solution in the aqueous medium and has a much reduced time to polymerize thus allowing some unreacted monomer to leave the reactor together with the polymer. This causes operational problems. In addition, the obtained polymer is contaminated with unreacted monomer and the presence of larger amounts of unreacted monomer can lead to further processing problems when granulating and drying the polymer.

If a polymer of low unreacted monomer content is needed, the unreacted monomer has to be removed in an additional step, for example by treatment with further initiator. However, polymers containing a larger amount of initiator are prone to degradation over time and thus are not favoured.

WO 2006/117292 set out to overcome this problem by conducting the polymerisation process in a conical reactor which is either a vertical fully conical reactor or is made up of 2 to 5 connected vertical conical parts, which are on top of one another. The process made significant advances in overcoming the aforementioned problems. Unfortunately this process is still sometimes prone to the problem of the polymer product being contaminated with unreacted monomer.

Therefore it is an objective of the present invention to provide a process for more consistently preparing a polymer with low residual unreacted monomer. Further, it would also be desirable to provide such a process which can be operated continuously.

Thus according to the present invention a process for preparation of a polymer product comprising the steps of
i) feeding an aqueous mixture comprising a monoethylenically unsaturated monomer or a mixture of monoethylenically unsaturated monomers into a first reactor device (2) through at least one inlet;
ii) partially polymerising the monomer or monomers and transferring the polymerising monomer or mixture of monomers from the inlet to an outlet (3) of the first reactor device (2) to provide a partially polymerised product;
iii) flowing the partially polymerised product out of the outlet (3) of the first reactor device (2), in which no more than 60% of the monomer or mixture of monomers has been polymerised in the partially polymerised product as it exits the outlet of first reactor device (2), and transferring it to a further reactor device (5), in which the further reactor device (5) has an inlet and an outlet (6);
iv) continuing the polymerisation in the further reactor device (5) and removing the polymer product from the outlet (6) of the further reactor device (5),
characterised in that
the first reactor device (2) comprises a positive displacement pump.

By positive displacement pump we mean a device which will propel the polymerising monomer and partially polymerised product through the first reactor device.

Such positive displacement pumps may be either a reciprocating type or a rotary type.

Reciprocating pumps for instance involve the action of components moving back and forth within a chamber. Reciprocating pumps are generally divided into two categories, the first comprising a diagram and the second involving a piston or plunger. Examples of diaphragm pumps include either simplex and multiplex actions. Examples of piston or plunger pumps include power piston or plunger pumps which may be single acting or double acting and include simplex, duplex, triplex, or multiplex actions. Alternatively the piston or plunger pumps may be scheme double acting which tend to be either simplex for duplex.

Rotary pumps include multiple rotor pumps or single rotor pumps. A multiple rotor, may be of the gear, lobe, circumferential piston or screw types. Single rotor pumps may be of the vane, piston, progressing cavity or peristaltic types. Gear pumps include pumps that comprise two or more impellers within a rotary pump casing. Typically the impellers in a gear pump may take the form of toothed gear wheels, of helical gears or of lobed cams. Multiple rotor pumps may be of the gear, lobe or circumferential piston types.

However, it is important that whichever type of pump is selected it is capable of transferring the polymerising monomer and partially polymerised product along the first reactor device. Pumps which are incapable transferring both polymerising monomer and partially polymerised product in this way will not be considered to be positive displacement pumps in accordance with the present invention.

In accordance with the invention we also provide an apparatus for preparation of a polymer product comprising
i) a first reactor device (2); and
ii) a further reactor device (5) comprising an inlet and an outlet (6),
characterised in that
the first reactor device (2) comprises a positive displacement pump.

Figure 1:
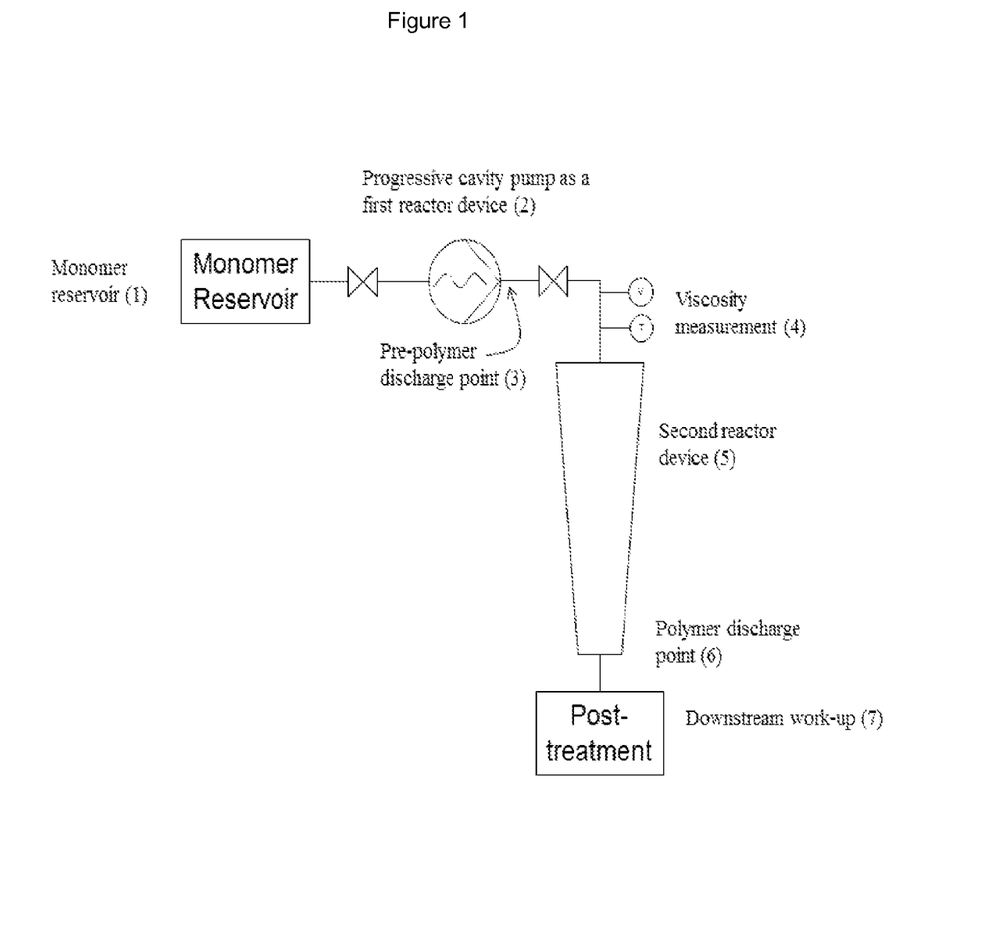
FIG. 1 shows the preferred arrangement where in the monomer reservoir (1) feeds the monomer solution through the first inlet of the first reactor device (2), being a progressive cavity pump. Partially polymerised product (pre-polymer) exits the first reactor device through the pre-polymer discharge point (outlet) (3) where the viscosity is assessed (4) and enters the second reactor device (5) where the polymerization continues to finally exist through the polymer discharge point (outlet) (6) and into the downstream operation (7).
Figure 2:
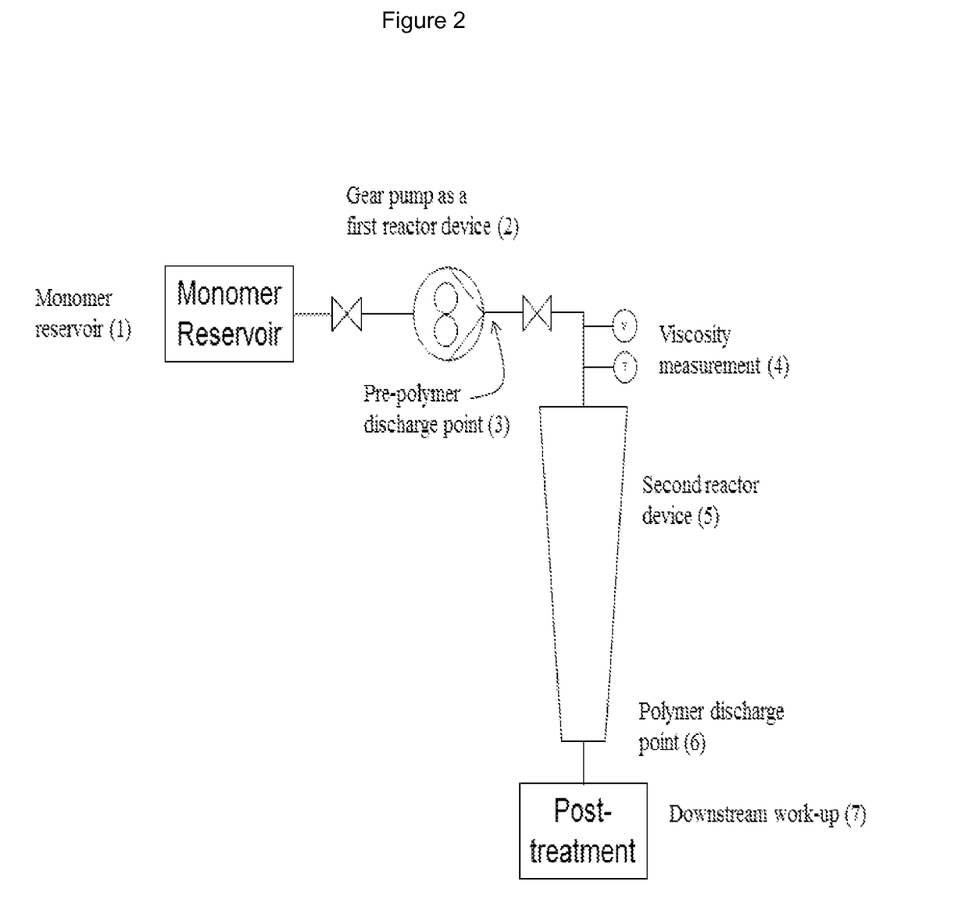
FIG. 2 shows another preferred setup where in the positive displacement pump is a gear pump.

Preferably, the first reactor device comprises a rotor within a stator and a multiplicity of cavities formed between the rotor and the stator in which the monomer or mixture of monomers enters and within which it is transferred as partially polymerising monomer or monomers from the inlet to the outlet of the first reactor device. More preferably the first reactor device comprises or is a progressive cavity pump.

The inventors of the present invention discovered that by partially polymerising the monomer in a first reactor device and then introducing the partially polymerised product into the top of a further reactor device that the polymer product can be prepared more consistently without contamination from unreacted monomer.

However, the inventors also found that special care has to be taken in preparing the partially polymerised product. It was discovered that without the special features of the first reactor device the partially polymerised product may contain unreacted monomer separated from the partially polymerised product. Further, when running the process in continuous mode it was also found that the monomer may even bypass partially polymerised product. It was unexpectedly discovered that by employing a first reactor device comprising a positive displacement pump and preferably a device which comprises a rotor within a stator and a multiplicity of cavities between the rotor and the stator that a more consistent partially polymerised product can be obtained. Generally in this process unreacted monomer would tend to be distributed throughout the partially polymerised product.

Suitably no more than 60% by weight of the monomer or mixture of monomers should have been polymerised in the partially polymerised product as it exits the outlet at the first reactor device. If the conversion of the monomer or monomer mixture exceeds this level it will generally be more difficult to remove the partially polymerised product from the first reactor device and also may risk the formation of blockages within the first reactor device or is outlet. Typically no more than 50%, usually no more than 40%, and often no more than 20 or 30% and normally no more than 15% of the monomer or mixture of monomers should have been polymerised in the partially polymerised product as it exits the outlet. If insufficient conversion of the monomer or monomer mixture to a polymeric species has occurred it may be difficult to ensure that the polymer product is not contaminated with unreacted monomer. Generally above 0.1% by weight of the monomer or mixture of monomers should have been polymerised in the partially polymerised product. C Suitably, this should be at least 1.0% by weight and often at least 2.0% by weight or even at least 3% by weight.

It is generally desirable to ensure that the partially polymerised product exiting the first reactor device exhibits suitable flow characteristics in order to facilitate the transfer of the partially polymerised product to the further reactor device. Further, the flow characteristics of the partially polymerised product entering the further reactor device may also facilitate the flow of the polymerising product inside the further reactor device. The partially polymerised product enters the further reactor device suitably through an inlet at a first end and continues to polymerise within the further reactor device and the polymer product is removed from an outlet suitably at the second end of the further reactor device. Preferably, as the partially polymerised product continues to polymerise it moves within the further reactor device from the first end to the second end such that the layers of polymerising material should transfer within the further reactor device without any significant mixing with layers of polymerising material.

Suitably the viscosity of the partially polymerised product which exits the first reactor device may be up to 50,000 or up to 30,000 mPas. Often the viscosity may be below 20,000 mPas and typically no more than 10,000 mPas. The viscosity suitably may be at least 100 mPas and usually at least 250 mPas and frequently at least 500 mPas. A particularly suitable range of viscosity has been found to be between 1000 and 5000 mPas. The viscosity of the partially polymerised product is measured at whatever temperature it exits the first reactor device. Generally the temperature will be between −5 and 100° C., typically between 5° C. and 30° C. Viscosity can be measured by a suitable viscosity measuring instrument which can be mounted in line.

A suitable instrument includes the In-Line Viscometer from Cambridge Viscosity Incorporated of Medford, Mass., USA. The general literature describes in line this rheometry instruments, for instance "In Line Ultrasonic Rheology by Pulsed Doppler", David M Pfund et al, Ultrasonics 44 (2006), e477-e482 and "Methodology for In-Line Rheology by Ultrasound Doppler Velocity Profiling and Pressure Difference Techniques", Chemical Engineering Science 62 (2007) 4277-4293. U.S. Pat. No. 5,059,914 describes microwave device for the continuous measurement of the viscosity of a viscous medium.

The residence time of the polymerising monomer or mixture of monomers from the inlet to the outlet of the first reactor device will usually be at least 20 seconds and often at least 30 seconds. Generally the residence time would not exceed 30 minutes and typically no more than 20 minutes and often not more than 10 minutes. Desirably the residence time should be between 0,5 and 10 minutes, especially between 1 and 8 minutes.

Typically the first reactor device would comprise an inlet at one end and an outlet at the other end. The rotor and the stator may generally be regarded as being analogous to the rotor and the stator of a progressive cavity pump. Preferably, the first reactor device is a progressive cavity pump. The rotor is typically of a rigid construction suitably being of an eccentric helix. Generally it will be constructed of a metal, for instance steel. The stator may generally form of a flexible material, for instance rubber or other elastic resinous material, and desirably formed as a sleeve which fits the rotor in order to create a multiplicity of cavities between the rotor and inner surface of the stator. The exact number of cavities is not important but generally there will be at least 2 cavities and usually at least 4 cavities. In some cases it may be desirable for there to be as many as 30 or more cavities but usually there would be no more than 20 cavities.

Suitably the rotor should fit within the stator in order to create a seal so as to prevent any significant seepage of monomer or polymerising material between the cavities. During the operation of the process the rotor should be rotated such that the cavities progress from the inlet end to the outlet end of the first reactor device. The monomer or mixture of monomers should be introduced into a cavity and the inlet end of the first reactor device. As the rotor rotates the cavity will move from the inlet end of the first reactor device to the outlet end. Within each cavity the monomer or mixture of monomers will polymerise to form the partially polymerised product. The inventors have found that the polymerising monomers tend to progress through the first reactor device with essentially plug flow. By this we mean that there is substantially no transfer of polymerising monomers and partially polymerised product between the different cavities. By substantially we mean that the amount of transfer between cavities is generally below 0.5% by weight and usually below 0.1% by weight.

The rotor should suitably rotate at a speed of at least 0.25 rpm and typically at least 0.5 rpm. The rotation speed may be as much as 50 rpm or more but is generally below 30 rpm and often below 20 rpm. Preferably the rotation speed should be between 1 and 15 rpm.

The positive displacement pump may be powered by any suitable power source, for instance by a motor or other device that will drive the pump. It is possible that the power source may be located at either end of the first reactor device. However, it is preferred that the power source is located at the outlet end of the first reactor device. This is especially the case when the positive displacement pump is a rotor within a stator and a multiplicity of cavities formed between the rotor and the stator, in particular a progressive cavity pump. Desirably the power source, for instance motor, maybe in direct communication with the rotor of pump and preferably located such that the rotor is driven from the outlet end of the first reactor device. The inventors have found that by driving the rotor from the other end of the first reactor device there is an improved transfer of the partially polymerised product through the first reactor device and also improved ability to force the partially polymerised product through the outlet of the first reactor device and into the further reactor device.

The further reactor device may be any suitable polymerisation unit which allows monomer or partially polymerised product to enter through an inlet and allow polymerisation with a form a polymer product which would be removed from an outlet.

It may be desirable for the further polymerisation device to be mounted substantially vertically. It may be desirable for the first end to be the upper end of the further reactor device and the second end to be the lower end. In this case the partially polymerised product would enter the further reactor device through the inlet at the upper end (first end) and the polymer product to be removed from an outlet at the lower end (second end) of the further reactor device. The partially polymerised product would continue to polymerise within the further reactor device as it descends within the further reactor device.

Alternatively, the inlet end may be mounted at the lower end (first end) of the further reactor device and the outlet end mounted and the upper end (second end) of the further reactor device. In this case the partially polymerised product would enter the further reactor device through the inlet at the lower end and the polymer product would be removed from an outlet at the upper end of the further reactor device. The partially polymerised product would continue to polymerise within the further reactor device.

Suitably the further reactor device may be an upright column type reactor with an inlet, side walls and an outlet. The cross-section of the further reactor device may be circular, elliptical or any polygonal shape. The walls of the further reactor device may be essentially parallel, for instance forming a cylinder and therefore being of a tubular construction. Alternatively the further reactor device may be conical or at least contain conical sections. Further, the further reactor device may comprise at least one tubular or at least one conical section or a combination of at least one tubular and at least one conical sections.

Preferably, the further reactor device is either a vertical fully conical reactor having an angle (a) between top diameter ($d_1$) of the further reactor device and inner wall of the reactor is smaller than 90° but larger than 45° or is made up of 2 to 5 connected vertical fully conical parts, which are on top of one another, each having an angle between top diameter of a part and inner wall of smaller than 90° but larger than 45°.

Desirably, the further reactor device is a vertical fully conical reactor having an angle (a) between top diameter ($d_1$) of the reactor and inner wall of the reactor of smaller than 90° but larger than 45°.

Preferably, the angle is smaller than 90°, but larger than 60°. More preferably, the angle is smaller than 90°, but larger than 70°. Even more preferably, the angle is smaller than 90°, but larger than 80°. Most preferably, it is smaller than 87° and larger than 83°.

The ratio of top diameter ($d_1$) to bottom diameter ($d_2$) of the reactor can be from 1.1/1 to 24/1. Preferably, it is from 2/1 to 10/1. More preferably, it is from 3/1 to 8/1. Most preferably, it is from 5/1 to 6/1.

When the further reactor device is made up of 2 to 5 connected vertical fully conical parts, the vertical fully conical parts can be the same or different. The ratio of top diameter to bottom diameter of one of the vertical conical parts can be from 1.1/1 to 24/1. Preferably, it is from 1.1/1 to 10/1. More preferably, it is from 1.2/1 to 5/1. Most preferably, it is from 1.5/1 to 3/1.

The further reactor device can be made of any suitable material, for example steel, mild steel, stainless steel or glass fibre reinforced plastic. The inner wall of the reactor is coated with an anti-adhesive coating such as polytetrafluoroethylene (PTFE), perfluoroalkoxy copolymer (PFA) or fluoro ethylene propylene (FEP). The reactor has at least one gas inlet and at least one inlet for feeding the monomer and initiator at the top of the reactor and at least one outlet at the bottom of the reactor to remove the polymer. The reactor can be sealed pressure-tight. The reactor can have a cooling/heating device and a stirring device, but preferably the reactor has no such devices.

The partially polymerised product may enter the further reactor device at a speed that allows a residence time of about 2 to 6 hours. The residence time depends on the monomer used and can be adjusted by a person skilled in the art.

Preferably, the polymerization is performed in the absence of oxygen and in the presence of an inert gas such as nitrogen. Preferably, the inert gas pressure during the polymerization is between 1 and 10 bar, more preferably, between 1 and 5 bar, and most preferably, between 1 and 3 bar. The temperature of the reaction mixture can increase up to 100 C during polymerization. Preferably, the temperature of the reaction mixture is between 85 and 95° C. during polymerization. The temperature can be controlled by a heating and cooling device, but it is preferably controlled by the amounts of monomer and initiator in the aqueous medium fed into the top of the reactor. The polymerization yields a polymer, which forms a gel-like mixture in the aqueous medium. The resulting polymer usually contains between 1 and $10^8$ monomer units and is either water-soluble or water-insoluble. It can be water-swellable or non-water-swellable.

As soon as the polymer forms a gel-like mixture at the bottom of the further reactor device, the bottom outlet can be opened and the reaction mixture can be squeezed out from the bottom of the reactor using inert gas such as nitrogen. Preferably, the inert gas pressure applied is between 1 and 10 bar, more preferably, between 1 and 5 bar, and most preferably, between 1 and 3 bar.

Preferably, the content of unreacted monomer in the polymer obtained is below 0.15% by weight based on the weight of the polymer. More preferably, it is below 0.1% by weight based on the weight of the polymer. Most preferably, it is below 0.01% by weight based on the weight of the polymer.

The obtained gel-like mixture comprising the polymer can be granulated and dried in a conventional granulating and drying apparatus to yield polymer having a water content of below 12% by weight.

The process can be performed in a batch or continuous mode. Preferably, it is performed in a continuous mode.

The polymer produced by the process can be used to flocculate solid particulates in water to aid water purification in industries ranging from mining to sewage treatment, bind paper fibres during the paper manufacturing process and coagulate metal ore particulates to enhance metal extraction.

Also part of the invention is the reactor, which is adopted for the process of the present invention. Details regarding the reactor are explained above.

Also part of the invention is polymer produced by the process of the present invention.

The monoethylenically unsaturated monomers can be water-soluble or water-insoluble monoethylenically unsaturated monomers. The monoethylenically unsaturated monomers may be obtained by a chemically catalysed process, a biologically catalysed process or a biological process.

Water-soluble monoethylenically unsaturated monomers can be carboxylic acids of formula (I)

or salts thereof, in which $R^1$, $R^2$ and $R^3$ are the same or different and are hydrogen, $C_{1-2}$-alkyl, carboxy or $C_{1-2}$-alkyl substituted with carboxy, (II)

wherein $R^7$, $R^8$ and $R^9$ are the same or different and are hydrogen or $C_{1-2}$-alkyl, E is $C_{2-5}$-alkylene, $R^4$, $R^5$ and $R^6$ are the same or different and are $C_{1-4}$-alkyl and X is a suitable anion,
amides of formulae (III)

(IV)

(V)

wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation,
vinyl derivatives or diallylammonium derivatives.

Examples of carboxylic acids of formula I are acrylic acid, methacrylic acid, crotonic acid, itaconic acid, maleic acid and fumaric acid. Salts thereof can be ammonium or alkali metal salts thereof. Examples of alkali metals are sodium and potassium.

$C_{1-2}$-Alkyl can be methyl or ethyl. Examples of $C_{2-5}$-alkylene are ethylene, trimethylene, propylene, 2-methylpropylene, tetramethylene, ethylethylene and pentamethylene. Examples of $C_{1-4}$-alkyl are methyl, ethyl, propyl, isopropyl and butyl, isobutyl, sec-butyl and tert-butyl. Examples of suitable anions are halogenide, sulfate and $C_{1-4}$-alkylsulfate. An example of $C_{1-4}$-alkylsulfate is methylsulfate. Examples of a halogenide are bromide and chloride. A preferred halogenide is chloride. Examples of suitable cations are hydrogen, ammonium and alkali metal.

Examples of esters of formula II are dimethylaminoethylacrylate methyl chloride quaternary salt, diethylaminoethylacrylate ethyl chloride quaternary salt and dimethylaminoethylmethacrylate methyl chloride quaternary salt.

Examples of amides of formulae III, IV or V are acrylamide, methacrylamide, crotonamide, dimethylaminoethylacrylamide methyl chloride quaternary salt, diethylaminoethylacrylamide ethyl chloride quaternary salt, dimethylaminoethylmethacrylamide methyl chloride quaternary salt and 2-acrylamido-2-methypropane sulfonic acid.

Examples of vinyl derivatives are vinylphosphonic acid or vinylsulfonic acid and salts thereof, such as ammonium or alkali metal salts thereof, N-vinylformamide, N-vinylpyrrolidinone and 1-vinylimidazole. An example of a diallylammonium derivative is diallyldimethylammonium chloride.

Water-insoluble monoethylenically unsaturated monomers can be esters of carboxylic acids of formula I with a $C_{1-18}$-alkanol.

Examples of $C_{1-18}$-alkanols are methanol, ethanol, propanol, isopropanol, butanol, hexanol, 2-ethylhexanol and octadecanol.

Examples of water-insoluble monoethylenically unsaturated monomers are methyl acrylate, ethyl acrylate, butyl acrylate, 2-ethyl hexyl acrylate, stearyl acrylate, methyl methacrylate and stearyl methacrylate.

Preferably the monoethylenically unsaturated monomers are water-soluble.

More preferred monoethylenically unsaturated monomers are water-soluble and are selected from the group consisting of
carboxylic acids of formula (I)

or salts thereof, in which $R^1$, $R^2$ and $R^3$ are the same or different and are hydrogen or methyl, carboxy or methyl substituted with carboxy,
esters of formula wherein $R^7$, $R^8$ and $R^9$ are the same or different and are hydrogen or methyl, E is $C_{2-3}$-alkylene, $R^4$, $R^5$ and $R^6$ are the same or different and are $C_{1-3}$-alkyl and X is a suitable anion,
amides of formulae wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation.

Examples of $C_{2-3}$-alkylene are ethylene, trimethylene and propylene. Examples of $C_{1-3}$-alkyl are methyl, ethyl, propyl and isopropyl.

Even more preferred monoethylenically unsaturated monomers are water-soluble and are selected from the group consisting of
carboxylic acids of formula or salts thereof, in which $R^1$ is hydrogen or methyl and $R^2$ and $R^3$ are both hydrogen, esters of formula wherein $R^7$ is hydrogen or methyl, and $R^8$ and $R^9$ are both hydrogen, E is ethylene, $R^4$, $R^5$ and $R^6$ are the same or different and are $C_{1-2}$-alkyl, and X is halogenide, sulfate or $C_{1-4}$-alkylsulfate,
amides of formulae wherein $R^7$, $R^8$, $R^9$, E, $R^4$, $R^5$ and $R^6$ and X have the meaning as indicated above, $R^{10}$ is hydrogen or methyl, L is $C_{2-5}$-alkylene, and M is hydrogen, ammonium or an alkali metal.

Most preferred monoethylenically unsaturated monomers are water-soluble and are selected from the group consisting of acrylic acid or salts thereof, esters of formula wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate,
acrylamide and amides of formula wherein $R^7$, $R^8$, $R^9$ have the meaning as indicated above, L is $C_{2-4}$-alkylene, $R^{10}$ is hydrogen, and M is hydrogen, ammonium or an alkali metal.

Examples of $C_{2-4}$-alkylene are ethylene, trimethylene, propylene, 2-methylpropylene, tetramethylene and ethylethylene.

Even most preferred the monoethylenically unsaturated monomer is water-soluble and is either acrylamide or a mixture of acrylamide with water-soluble monoethylenically unsaturated monomer selected from the group consisting of acrylic acid or salts thereof, and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate.

Preferably, the amount of acrylamide in the mixture of acrylamide with water-soluble monomethylenically unsaturated monomer selected from the group consisting of acrylic acid or salts thereof, and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate, is at least 30% by weight based on the weight of the monomer mixture.

When the monomer or mixture of monomers comprises acrylamide, the acrylamide may have been produced by a suitable process, for instance by hydrolysis of acrylonitrile. Typically this may be one of the known chemically catalysed processes using inorganic catalysts such as Raney copper. Preferably however, the acrylamide would have been prepared using a biological or biologically catalysed process. Suitably this may be achieved by contacting acrylonitrile with a nitrile hydratase enzyme, for example as documented in the patents and literature. Superior polyacrylamide products may be obtained by employing the process of the present invention to polymerise acrylamide, optionally in combination with other ethylenically unsaturated monomers, wherein acrylamide has been obtained by a biological process. Such polyacrylamides would exhibit superior properties as flocculants for instance for water treatment (including sewage sludge treatment), mining applications and as retention/drainage aids in the paper industry.

Depending on the monoethylenically unsaturated monomer or monomer mixture used, the polymers produced by the process of the present invention can be anionic, cationic or non-ionic.

Any suitable initiator can be used. The initiator can be, for example, a peroxide, a persulfate, an azo compound, a sulfate, a redox couple or mixtures thereof.

Examples of peroxides are hydrogen peroxide, potassium peroxide, tert-butyl peroxide, tert-butyl hydroperoxide, cumene hydroperoxide and benzoyl peroxide. Examples of persulfates are ammonium, sodium or potassium persulfate.

Examples of azo compounds are 2,2-azobisisobutyronitrile, 4,4'-azobis(4-cyanovaleric acid) and 2,2'-azobis(N,N'-dimethyleneisobutyramidine)dihydrochloride, 1,1'-azobis(cyclohexanecarbonitrile) and 2,2'-azobis(2-amidinopropane) dihydrochloride. Examples of sulfates are ferrous ammonium sulfate and ammonium sulfate. Redox couples consist of an oxidizing agent and a reducing agent. The oxidizing agent can be one of the above listed peroxides, persulfates, sulfates or azo compounds, or an alkali metal chlorate or bromate. Examples of alkali metals are given above. Examples of reducing agents are ascorbic acid, glucose or ammonium or alkali metal hydrogen sulfite, sulfite, thiosulfate or sulfide, or ferrous ammonium sulfate.

Preferably, the initiator is a mixture of a redox couple with one or more initiators selected from the group consisting of peroxides, persulfates and azo compounds.

More preferably, the initiator is a mixture of a redox couple, wherein the oxidizing agent is selected from the group consisting of peroxides and alkali metal bromates, and the reducing agent is selected from the group consisting of ammonium or alkali metal hydrogen sulfite, sulfite, thiosulfate or sulfide, or ferrous ammonium sulfate, with one or more azo compound initiators.

Even more preferably, the initiator is a mixture of a redox couple, wherein the oxidizing agent is selected from the group consisting of hydrogen peroxides and alkali metal bromates, and the reducing agent is an alkali metal hydrogen sulfite or sulfite, with one or more azo compound initiators.

Most preferably, the initiator is a mixture of a redox couple, wherein the oxidizing agent is selected from the group consisting of tert-butylhydroperoxide and potassium bromate, and the reducing agent is sodium sulfite, with one or more azo compound initiators selected from the group consisting of 2,2-azobisisobutyronitrile, 4,4'-azobis(4-cyanovaleric acid) and 2,2'-azobis(N,N'-dimethyleneisobutyramidine).

The aqueous mixture comprising the monoethylenically unsaturated monomer or monomer mixture and an initiator can be a solution, dispersion or a suspension of the monomers and the initiator in water or buffer. Preferably, it is a solution of the monomers and initiator in water.

The aqueous mixture comprising the monomers and initiator may also contain additives such as urea, sequesterant agents, organic acids, chain transfer reagents and cross-linking agents.

Examples of sequesterant agents are diethylenetriaminepentaacetic acid, penta sodium salt, and diethylenediaminetetraacetic acid, tetra sodium salt.

Examples of organic acids are adipic acid, citric acid, oxalic acid, tartaric acid, malic acid and benzoic acid.

Examples of chain transfer reagents are thioglycolic acid, sodium hypophosphite, 2-mercaptoethanol, N-dodecyl mercaptan and tert-dodecyl mercaptan.

Examples of cross-linking agents are polyethylenically unsaturated monomer such as N,N'-monomethylenebisacrylamide, poly(ethylene glycol)diacrylate, tetra allyl ammonium chloride and di allyl phthalate.

Preferably, the aqueous medium also contains urea, a sequesterant agent and/or an organic acid. More preferably, the aqueous medium also contains urea, diethylenetriaminepentaacetic acid, penta sodium salt and/or an adipic acid.

If the polymer produced by the process of the present invention is cationic, the aqueous medium most preferably also contains diethylenetriaminepentaacetic acid, penta sodium salt and adipic acid. If the polymer produced is anionic the aqueous medium most preferably also contains diethylenetriaminepentaacetic acid, penta sodium salt and urea. If the polymer produced is non-ionic, the aqueous medium most preferably also contains diethylenetriaminepentaacetic acid, penta sodium salt, urea and adipic acid.

Preferably, the amount of the monoethylenically unsaturated monomer or monomer mixture in the aqueous mixture is between 5 and 60% by weight based on the weight of the aqueous mixture fed into the top of the reactor. More preferably, it is 10 to 50% by weight based on the weight of the aqueous mixture. Even more preferably, it is 25 to 40% by weight based on the weight of the aqueous mixture. Most preferably, it is 28 to 35% by weight based on the weight of the aqueous mixture.

Initiation of polymerisation of the monomer or mixture of monomers introduced into the first reactor device may be achieved by the use of conventional polymerisation initiators, for instance free radical initiation systems, such as redox initiators and/or thermal initiators. Suitable initiators include peroxides, for instance t-butyl peroxides, azo compounds, for instance azobisisobutyronitrile; inorganic compounds, such as potassium persulphate and redox couples, such as ferrous ammonium sulphate/ammonium persulphate. It may be desirable to include the initiators into the monomer or monomers prior to the introduction into the first reactor device. Alternatively, initiators may be introduced directly into the monomer or monomers within the first reactor device. In some situations it may be desirable to introduce initiators into the monomer or monomers prior to entry into the first reactor device and then add further initiators to the monomer or monomers within the first reactor device.

Polymerisation may also be effected by photo chemical irradiation processes, such as ultraviolet irradiation or by ionising irradiation from a cobalt 60 source.

Preferably, the total amount of initiator in the aqueous mixture is between 0.001 to 5% by weight based on the weight of the monomer or monomer mixture. More preferably, it is 0.005 to 2% by weight based on the weight of the monomer or monomer mixture. Most preferably, it is 0.05 to 1% by weight based on the weight of the monomer or monomer mixture. If the initiator is an initiator mixture comprising a redox couple, the amount of oxidizing agent is preferably from 0.0001 to 1%, more preferably from 0.0002 to 0.01%, by weight based on the weight of the monomer, and the ratio of reducing agent to oxidizing agent is from 3/1 to 1/4, preferably from 2.5/1 to 1/3.

Preferably the amount of additives is between 0.0001 to 20% by weight based on the weight of the monomer. More preferably, it is from 0.001 to 15% by weight based on the weight of the monomer.

It may be desirable that the aqueous mixture comprising monomer or monomer mixture and the initiator are prepared by vigorously mixing an aqueous solution of the monomer or monomer mixture with an aqueous solution of initiator before feeding the resulting solution to the inlet of the reactor. Alternatively an aqueous solution of initiator can be introduced into the aqueous solution of the monomer or monomer mixture within the first reactor device and for instance be mixed together vigorously. Preferably, the aqueous solution of ethylenically unsaturated monomers is degassed before being mixed with the initiator solution.

Preferably, the aqueous mixture comprising the monomer or monomer mixture and the initiator can be prepared by vigorously mixing an aqueous solution containing the monomer or monomer mixture, one or more azo compound initiators and additives such as urea, organic acids or sequesterant agents with an aqueous solution containing a redox couple initiator and optionally additional azo compound initiator before feeding the resulting solution to the first reactor device or after introduction of the aqueous solution containing the monomer or monomer mixture into the first reactor device.

Preferably, the aqueous mixture comprising the monomer and the initiator is cooled below 25 C, before being fed into the first reactor device. More preferably, it is cooled to 10° C. Even more preferably, it is cooled to 0° C. Most preferably, it is cooled to −5° C.

The advantage of the process of the present invention is that the reactor apparatus can run continuously without significant pressure changes producing polymer with a low content of unreacted monomer. Thus, the problems of previous processes, namely inconvenient control of the pressure during the reaction, contamination of the dryer with unreacted monomer and post-treatment of the polymer to reduce the amount of unreacted monomer, are avoided.

The polymer product produced according to this invention typically may have an intrinsic viscosity (IV) of at least 4 dl/g, for instance at least 5 or 6 dl/g or even higher, for instance at least 10 dl/g or even more than 14 or 15 dl/g. The intrinsic viscosity may be as high as 30 dl/g but is usually up to 25 or 26 dl/g, for instance up to 21 or 22 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per litre of deionised water) and the whole is diluted to the 100 ml mark with deionised water. The intrinsic viscosity of the polymers is measured using a Number 1 suspended level viscometer at 25° C. in 1M buffered salt solution. Intrinsic viscosity values stated are determined according to this method unless otherwise stated.

The weight average molecular weight of the polymer beads should generally be at least 1 million, for instance at least 2 million and often at least 3 million, preferably at least 5 million. In some cases the weight average molecular weight may be at least 7 million and sometimes at least 10 million. The weight average molecular weight may be as high as 18 or 20 million, for instance as high as 25 million or even as high as 30 million or higher. The molecular weight can be determined for example by static light scattering, small angle neutron scattering, x-ray scattering or sedimentation velocity.

The following examples are an illustration of the invention.

Example 1

Preparation of an Anionic Polymer in a Plunger-Type Reciprocating Pump as Pre-Reactor An aqueous monomer solution is prepared in a 5 L glass jacketed vessel wherein the vessel is equipped with a nitrogen inlet to deoxygenate the solution for 15 minutes. The aqueous monomer solution contains 2128 g of a 50 wt.-% aqueous solution of acrylamide, 1232.43 g of sodium salt of 2-propenoic acid, 1.5 g of 2-(azo(1-cyano-1-methylethyl))-2-methylpropane nitrile, 1.5 g of 4,4'-Azobis(4-cyanovaleric acid), 3 ppm of a 70 wt.-% aqueous solution of 2-methylpropan-2-peroxol and 1150 g of demineralized water. The solution is cooled down to an approximate temperature of 0° C. The plunger-type reciprocating pump consists of a cylindrical fluorinated body with a plunger that moves within the internal space. The aqueous degassed solution is fed to the plunger pump from the top. The mixture is then stirred and initiated and shortly after a conversion of 20 wt.-% measured with a Temperature probe, the plunger-type reciprocating pre-reactor is moved 135° counterclockwise and the contents are pushed towards a receiving vessel where the reaction continues until completion. The plunger vessel has an internal diameter of 60 mm and a length of 250 mm. After full conversion, the polymer is converted into dry powder from which the unreacted monomer is analyzed using HPLC. The unreacted monomer accounts to less than 0.10% by weight.

Example 2

Preparation of a Cationic Polymer in a Progressive Cavity Pump

A mixture of acrylamide, acrylic acid and acryloxy ethyl trimethylammonium chloride are mixed and degassed and subsequently initiated through a mixture of 4,4'-Azobis(4-cyanovaleric acid), 2,2'-Azobis(2-methylpropionamidine)dihydrochloride and potassium bromate in a first reactor. The pre-polymerized mixture is subsequently conveyed to a second vessel located at the exit of the first reactor. The temperature at the outlet of the first reactor is 20° C. and enters the second reactor at a viscosity of 2300 mPas, which is estimated through a differential pressure measurement. The first part of the reaction takes place in a progressive cavity pump with 27 cavities rotating at a speed of 10 rpm and the rest of the polymerization continues in a second vessel. The residence time within the first reactor is 8 minutes and within the second reactor is 4 hours. Analyses from the pre-polymer state the unreacted monomer is below 0.10% by weight with respect from active polymer, which suggests that the contamination of the product with unreacted monomer was avoided and post polymerization treatment was required.

Example 3

Preparation of a Cationic Polymer in a Tubular Reactor

Acrylamide solution is mixed in with acrylic acid and acryloxy ethyl trimethylammonium chloride together with a mixture of 4,4'-Azobis(4-cyanovaleric acid), 2,2'-Azobis(2-methylpropionamidine)dihydrochloride and potassium bromate and pumped using a gear pump through a tubular reactor with an internal diameter of 6 mm and a length of 3.2 m. The mixture is degassed for 15 minutes and cooled down to $-1°$ C. The polymerization starts thereafter at the exit of the gear pump and continues within the tubular reactor until it reaches a viscosity of 1000 mPas. At this point, the polymerization continues in a second vessel batch-wise. The temperature at the end of the tubular reactor is 7° C. and at the end of the polymerization is 90° C.

Example 4

Preparation of an Anionic Polymer in a Progressive Cavity Pump

A mixture of an aqueous acrylamide solution is mixed with a solution of the sodium salt of 2-propenoic acid and is initiated with 2,2'Azobis(2-methylpropionitrile), 2,2-Azobis(4-cyanopentanoic acid) and ter-butylhydroperoxide. At this point, the mixture is degassed for 15 minutes and cooled down to $-1°$ C. A progressive cavity pump with 12 cavities is used to convey 48.6 kg of the polymerizing monomer mixture every second towards a second reaction vessel, wherein the rest of the reaction takes place. The polymer leaves the pump after a residence time less than 1 minute at a temperature of 17° C. In this case, the analyses showed that the unreacted monomer after the second vessel was less than 0.10% wt., which is tested after comminuting the polymer into powder particles.

The invention claimed is:

1. A process for preparing a polymer product, the process comprising:
    i) feeding an aqueous mixture comprising a monoethylenically unsaturated monomer or a mixture of monoethylenically unsaturated monomers into a first reactor through at least one inlet;
    ii) partially polymerising the monomer or monomers and transferring the polymerising monomer or mixture of monomers from the inlet to an outlet of the first reactor to provide a partially polymerised product;
    iii) flowing the partially polymerised product out of the outlet, in which no more than 60% of the monomer or mixture of monomers has been polymerised in the partially polymerised product as it exits the outlet of first reactor, and transferring it to a further reactor, in which the further reactor has a further reactor inlet and a further reactor outlet; and
    iv) continuing the polymerisation in the further reactor and removing a polymer product from the outlet of the further reactor,
    wherein:
    the first reactor comprises a positive displacement pump and
    the first reactor further comprises a rotor within a stator and a multiplicity of cavities formed between the rotor and the stator in which the monomer or mixture of monomers enters and within which it is transferred as partially polymerising monomer or monomers from the inlet to the outlet of the first reactor.

2. The process of claim 1, wherein no more than 35% of the monomer or mixture of monomers has been polymerised in the partially polymerised product as it exits the outlet of first reactor.

3. The process of claim 1, wherein a viscosity of the partially polymerised product as it exits the outlet of the first reactor is no more than 50,000mPas.

4. The process of claim 1, wherein a residence time of the polymerising monomer or mixture of monomers from the inlet to the outlet of the first reactor is between 20 seconds and 10 minutes.

5. The process of claim 1, wherein the rotor of the first reactor rotates at between 1 and 15 rpm.

6. The process of claim 1, wherein the further reactor comprises at least one tubular or at least one conical section or a combination thereof.

7. The process of claim 1, wherein the further reactor is either a vertical fully conical reactor having an angle ($\alpha$) between a top diameter (d1) of the further reactor and an inner wall of the reactor is smaller than 90° but larger than 45°, or is made up of 2 to 5 connected vertical fully conical parts, which are on top of one another, each having an angle between a top diameter of a part and an inner wall of smaller than 90° but larger than 45°.

8. The process of claim 1, wherein the one or more monoethylenically unsaturated monomers are selected from the group consisting of acrylamide, methacrylamide, N-vinyl pyrrolidone, 2-hydroxy ethyl acrylate, acrylic acid, a salt of acrylic acid, methacrylic acid, a salt of methacrylic acid, itaconic acid, a salt of itaconic acid, maleic acid, a salt of maleic acid, 2-acrylamido-2-propane sulphonic acid, a salt of 2-acrylamide-2-propane sulfonic acid, vinyl sulphonic acid, a salt of vinyl sulphonic acid, allyl sulphonic acid, a salt of allyl sulphonic acid, dimethyl amino ethyl acrylate, an acid salt of dimethyl amino ethyl acrylate, a quaternary ammonium salt of dimethyl amino ethyl acrylate, dimethyl amino ethyl methacrylate, an acid salt of dimethyl amino ethyl methacrylate, a quaternary ammonium salt of dimethyl amino ethyl methacrylate, dimethyl amino propyl acrylamide, an acid salt of dimethyl amino propyl acrylamide, a quaternary ammonium salt of dimethyl amino propyl acrylamide, dimethyl amino propyl methacrylamide, an acid salt of dimethyl amino propyl methacrylamide, a quaternary ammonium salt of dimethyl amino propyl methacrylamide, and a combination thereof.

9. The process of claim 1, wherein one or more of the monoethylenically unsaturated monomers have been prepared by a chemically catalysed process, a biologically catalysed process or a biological process.

10. The process of claim 9, wherein the aqueous mixture comprises an acrylamide prepared by a biological catalysed process or a biological process.

11. The process of claim 1, which occurs in a continuous mode.

* * * * *